Patented Dec. 2, 1952

2,620,283

UNITED STATES PATENT OFFICE 2,620,283

PROCESS FOR THE PRODUCTION OF FIBROUS FILTER MEDIA

William Ivan Taylor and John William Grebby, Spondon, near Derby, England, assignors to Celanese Corporation of America, a corporation of Delaware No Drawing. Application September 4, 1948, Serial No. 47,947. In Great Britain September 23, 1947

5 Claims. (Cl. 117—65)

This invention relates to fibrous materials useful as filter media.

For certain purposes, for example for filtering solutions of organic derivatives of cellulose before they are extruded to form filaments and the like, filter media comprising a felted mass of textile fibres are used. Such media frequently rely for part of their efficiency on being compressed by the pressure exerted thereon by the material being filtered. In certain cases, for example when the filter media are used in candle filters for filtering cellulose derivative spinning solutions, the arrangement adopted is such that the output side of the felted mass of fibres does not rest against a rigid support, and the pressure of the material being filtered on the filter medium thus tends to decompress rather than to compress it, so reducing to some extent its efficiency.

Another disadvantage of filter media comprising compressed felted masses of fibres is that loose fibres sometimes escape from the filter medium and contaminate the filtrate. Such loose fibres may cause a great deal of trouble by impeding a subsequent flow of the filtrate through narrow passages or orifices, for example they may become lodged in a spinning jet and so destroy the uniformity of the yarn being spun.

It is an object of the present invention to provide a filter medium, the efficiency of which is not substantially or seriously affected even when it is used under conditions such as those above described, and which has little or no tendency to give rise to loose fibres.

A filter medium in accordance with the invention comprises a felted mass of fibres which has been compressed and is held in the compressed state by means of an adhesive. A form of structure in accordance with the invention which is of particular value in connection with the filtering of cellulose acetate spinning solutions comprises a felted mass of cellulose fibres which has been compressed and is held in the compressed state by means of an ether of cellulose insoluble in acetone, especially a water-soluble cellulose ether and in particular a water-soluble methyl cellulose.

The filter medium may, for example, be made by impregnating the mass of fibres with a solution of the adhesive and depositing the adhesive on the fibres, preferably by evaporating the solvent in which it is dissolved. Thus for example a gamgee or other felted mass of cotton fibres may be impregnated with an aqueous solution of a water-soluble methyl cellulose and then compressed to the desired degree and allowed to dry while still under pressure. For example a gamgee of initial thickness about $\frac{1}{2}$" in its uncompressed state may be impregnated with the methyl cellulose solution and then compressed for example down to about $\frac{1}{10}$" or $\frac{1}{25}$" in thickness. Quite dilute solutions of the methyl cellulose may be used, for example solutions of concentration between about 1% and 5%, although more concentrated solutions can be employed if desired.

Not only cotton but also other cellulosic fibres of natural origin or artificial fibres of regenerated cellulose may be used in the filter media of the invention, as also may fibres having a basis of some other material, for example a cellulose ester or ether, or a polyvinyl compound, a polyamide or other linear high polymer; the basis of the fibres must of course be such that the fibres are not dissolved or attacked by any liquid which is to be filtered. Similarly other adhesives may be used in place of a cellulose ether. In all cases the adhesive should be chosen having regard to its suitability for use with the particular fibres employed, and for most purposes it is desirable that it should be resistant to any liquid to be filtered. For example a filter medium for aqueous liquids may comprise a compressed mass of cotton, regenerated cellulose, or cellulose acetate filaments impregnated with an adhesive comprising a cellulose acetate of moderate or fairly low acetyl value, for example about 53–55% calculated as acetic acid.

Single sheets of the filter medium or a number of superimposed sheets may be employed, the arrangement adopted in any particular case depending on the nature of the fluid to be filtered and the thickness and denseness of the sheets.

Filter media in accordance with the invention are, as already indicated, of particular value in connection with the filtration of spinning solutions for the production of filaments, films, bristles and fibres. (These one and two-dimensional articles will be referred to in the claims as "gracile" shaped products to differentiate them from three-dimensional products such as rods, tubes and moulded articles.) For such purposes the filter media may be used, for example, in jet filters and in candle filters. But they are also of use in other types of filter, including filters having a large filtering area, and for other purposes. They are of particular value not only in cases where the filter medium does not rest on a rigid support as already described, but also in cases where the pressure difference between the two sides of the filter is not sufficient to maintain a felted filter medium of the known type in the desired state of compression, as may for example be the case in gas filters and in liquid filters where the liquid is of low viscosity and/or the rate at which the liquid passes the filter is low.

Although it is usually preferable, and if all the advantages of the invention are to be secured it is essential, that the adhesive should be insoluble in the material being fluted, certain advantages are obtained even if the adhesive is removable by the material being filtered. For example in assembling jets for spinning cellulose acetate filaments discs of a filter medium have to be inserted behind the orifices through which the solution is extruded. Heretofore it has been a common practice to employ a compressed gamgee or like material which has not been treated with an adhesive; this while effective does on occasions give rise to difficulties owing to the escape of loose fibres from the filter medium during manipulation. If in accordance with the invention the compressed gamgee or like material is impregnated with a dilute (e. g. a 1–4%) solution of cellulose acetate in acetone and the acetone is removed by evaporation, the resulting filter medium can be manipulated and the jet assembled without the separation of loose fibres, and this represents in practice a valuable advantage, even though the cellulose acetate is subsequently washed out of the filter medium when spinning begins.

Having described our invention, what we desire to secure by Letters Patent is:

1. Process for the production of a filter medium suitable for filtering spinning solutions of cellulose acetate in acetone, which comprises impregnating a felted sheet of cellulose fibres with an aqueous solution of a water-soluble cellulose ether, which is adherent to said cellulose fibres, compressing the impregnated felted sheet, and removing the water from the compressed sheet by evaporation while the sheet is still held in the compresed state.

2. Process for the production of a filter medium suitable for filtering spinning solutions of cellulose acetate in acetone, which comprises impregnating a felted sheet of cellulose fibres with an aqueous solution of a water-soluble methyl cellulose, which is adherent to said cellulose fibres, compressing the impregnated felted sheet, and removing the water from the compressed sheet by evaporation while the sheet is still held in the compressed state.

3. Process for the production of a filter medium suitable for filtering spinning solutions of cellulose acetate in acetone, which comprises impregnating a felted sheet of cellulose fibres with a 1%–5% aqueous solution of a water-soluble methyl cellulose, which is adherent to said cellulose fibres, compressing the impregnated felted sheet, and removing the water from the compressed sheet by evaporation while the sheet is still held in the compressed state.

4. Process for the production of a filter medium suitable for filtering spinning solutions of cellulose acetate in acetone, which comprises impregnating a felted sheet of cotton fibres with a 1%–5% aqueous solution of a water-soluble methyl cellulose, which is adherent to said cellulose fibres, compressing the impregnated felted sheet, and removing the water from the compressed sheet by evaporation while the sheet is still held in the compressed state.

5. Process for the production of a filter medium suitable for filtering spinning solutions of cellulose acetate in acetone, which comprises impregnating a felted sheet of cellulose fibres with a 1–5% solution of a water-soluble cellulose ether in a solvent, said cellulose ether being one which is adherent to cellulose fibers, compressing said impregnated felted sheet to about $\frac{1}{5}$ to $\frac{2}{25}$ of its original thickness and removing said solvent from the compressed sheet while the sheet is still held in the compressed state.

WILLIAM IVAN TAYLOR.
JOHN WILLIAM GREBBY.

REFERENCES CITED

The following references are of record in the file of this patent:

UNITED STATES PATENTS

| Number | Name | Date |
|---|---|---|
| 1,693,890 | Duclaux | Dec. 4, 1928 |
| 1,776,748 | Bloch | Sept. 23, 1930 |
| 1,877,337 | Kampf et al. | Sept. 13, 1932 |
| 1,898,601 | Shoemaker | Feb. 21, 1933 |
| 1,978,785 | Dreyfus | Oct. 30, 1934 |
| 2,152,901 | Manning | Apr. 4, 1939 |
| 2,249,928 | Allquist et al. | July 22, 1941 |
| 2,324,838 | Harz et al. | July 20, 1943 |
| 2,372,713 | Curado et al. | Apr. 3, 1945 |
| 2,411,660 | Manning | Nov. 26, 1946 |
| 2,496,665 | Hermanson | Feb. 7, 1950 |